(12) United States Patent
Zhou et al.

(10) Patent No.: US 8,465,691 B1
(45) Date of Patent: Jun. 18, 2013

(54) METHOD FOR MANUFACTURING INDIUM TIN OXIDE NANOWIRES

(75) Inventors: Chaoyin Zhou, Chino, CA (US); Amanda Phelps, Malibu, CA (US); Richard W. Burns, Edwardsville, IL (US); Wen Li, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 396 days.

(21) Appl. No.: 12/787,774

(22) Filed: May 26, 2010

(51) Int. Cl.
*D04H 1/728* (2012.01)

(52) U.S. Cl.
USPC .......................................... 264/640; 264/639

(58) Field of Classification Search
USPC .................................................. 264/639, 640
See application file for complete search history.

(56) References Cited

U.S. PATENT DOCUMENTS

| 7,592,415 B2* | 9/2009 | Hovanec et al. | 528/497 |
| 8,088,323 B2* | 1/2012 | Hellring et al. | 264/465 |
| 8,211,353 B2* | 7/2012 | Dee et al. | 264/465 |
| 2007/0116640 A1* | 5/2007 | Kim et al. | 423/610 |
| 2008/0146698 A1* | 6/2008 | Hovanec et al. | 523/332 |
| 2008/0207798 A1* | 8/2008 | Hellring et al. | 523/222 |
| 2010/0112373 A1* | 5/2010 | Coffey et al. | 428/608 |

OTHER PUBLICATIONS

Lee, Y-I. et al., "Synthesis and Electrical Property of Indium Tin Oxide Nanofibers Using Electrospinning Method," *Journal of Nanoscience and Nanotechnology*, vol. 7, pp. 3910-3913 (2007).

Wan, Q. et al., "Vertically aligned tin-doped indium oxide nanowire arrays: Epitaxial growth and electron field emission properties," *Applied Physics Letters*, 89, pp. 123102-1 through 123102-3 (2006).
Wan, Q. et al., "Epitaxial Growth of Vertically Aligned and Branched Single-Crystalline Tin-Doped Indium Oxide Nanowire Arrays," *Advanced Materials*, 18, pp. 234-238 (2006).
Munir, M.M. et al., "Optical and electrical properties of indium tin oxide nanofibers prepared by electrospinning," *Nanotechnology*, 19, 145603 (6 pages) (2008).
Lin, D. et al., "Preparation and electrical properties of electrospun tin-doped indium oxide nanowires," *Nanotechnology*, 18, 465301, 6 pages (2007).
Yu, D. et al., "Synthesis of ITO Nanowires and nanorods with corundum structure by a co-precipitation-anneal method," *Materials Letters*, 58, pp. 84-87 (2003).
Nguyen, P. et al., "Epitaxial Directional Growth of Indium-Doped tin Oxide Nanowire Arrays," *Nano Letters*, vol. 3, No. 7, pp. 925-928 (2003).
Wan, Q. et al., "High-Performance Transparent Conducting Oxide Nanowires," *Nano Letters*, vol. 6, No. 12, pp. 2909-2915 (2006).
Xia, Y. et al., "One-Dimensional Nanostructures: Synthesis, Characterization, and Applications," *Advanced Materials*, 15, No. 5, pp. 353-389 (Mar. 4, 2003).
McCann, J.T. et al., "Electrospinning of nanofibers with core-sheath, hollow, or porous structures," *Journal of Materials Chemistry*, 15, p. 735-738 (2005).

(Continued)

*Primary Examiner* — Joseph S Del Sole
*Assistant Examiner* — Russell Kemmerle, III
(74) *Attorney, Agent, or Firm* — Mark Blumenkrantz (57) ABSTRACT

A method for manufacturing indium tin oxide nanowires by preparing a solution that includes an indium-containing species, a tin-containing species and a polymeric material, wherein the solution has a molar ratio of tin to indium in a range from about 5 to about 15 percent, electrospinning fibers using the solution, and heating the fibers to a calcination temperature and maintaining the fibers at the calcination temperature for a predetermined calcination time.

10 Claims, 5 Drawing Sheets

OTHER PUBLICATIONS

Kim, P. et al., "Thermal Transport Measurement of Individual Multiwalled Nanotubes," *Physical Review Letters*, vol. 87, No. 21, pp. 215502-1 through 215502-4 (Nov. 19, 2001).

Small, J.P. et al., "Mesoscopic thermal and thermoelectric measurements of individual carbon nanotubes," *Solid State Communications*, 127, pp. 181-186 (2003).

Wang, H-W. et al., "Three-dimensional electrodes for dye-sensitized solar cells: synthesis of indium-tin-oxide nanowire arrays and ITO/$TiO_2$ core-shell nanowire arrays by electrophoretic deposition," *Nanotechnology*, 20, 055601, 9 pages (2009).

Treacy, M.M.J. et al., "Exceptionally high Young's modulus observed for individual carbon nanotubes," *Nature*, vol. 381, p. 678-680 (Jun. 20, 1996).

Wan, Q. et al., "Single-crystalline tin-doped indium oxide whiskers: Synthesis and characterization," *Applied Physics Letters*, vol. 85, No. 20, pp. 4759-4761 (Nov. 15, 2004).

Xue, X.Y. et al., "Synthesis and ethanol sensing properties of indium-doped tin oxide nanowires," *Applied Physics Letters*, 88, 201907, 3 pages (2006).

Wang, Y. et al., "Synthesis of ultra-fine porous tin oxide fibres and its process characterization," *Nanotechnology*, 18, 295601, 7 pages (2007).

Li, D. et al., "Electrospinning of Nanofibers: Reinventing the Wheel?" *Advanced Materials*, 16, No. 14, pp. 1151-1170 (2004).

Kim, H. et al., "Highly oriented indium tin oxide films for high efficiency organic light-emitting diodes," *Journal of Applied Physics*, vol. 91, No. 8, pp. 5371-5376 (Apr. 15, 2002).

Ohta, H. et al., "Highly electrically conductive indium-tin-oxide thin films epitaxially grown on yttria-stabilized zirconia (100) by pulsed-laser deposition," *Applied Physics Letters*, vol. 76, No. 19, pp. 2740-2742 (May 8, 2000).

Tahar, R.B.H. et al., "Electronic transport in tin-doped indium oxide thin films prepared by sol-gel technique," *Journal of Applied Physics*, vol. 83, No. 4, pp. 2139-2141 (Feb. 15, 1998).

Takada, T. et al., "Aqueous ozone detector using $In_2O_3$ thin-film semiconductor gas sensor," *Sensors and Actuators*, B 24-25, pp. 548-551 (1995).

Kamei, M. et al., "Heteroepitaxial growth of tin-doped indium oxide films on single crystalline yttria stabilized zirconia substrates," *Appl. Phys. Lett.*, 64 (20), pp. 2712-2714 (May 16, 1994).

Teo, W.E. et al., "A review of electrospinning design and nanofibre assemblies," *Nanotechnology*, 17, pp. R89-R106 (2006).

Unpublished U.S. Appl. No. 12/787,970, filed May 26, 2010.

* cited by examiner

METHOD FOR MANUFACTURING INDIUM TIN OXIDE NANOWIRES

FIELD

This application relates to indium tin oxide nanowires and, more particularly, to methods for manufacturing indium tin oxide nanowires.

BACKGROUND

Indium tin oxide, also known as tin-doped indium oxide or ITO, is used in a variety of applications due to its electrical conductivity and optical transparency. For example, indium tin oxide has been used as an electrically conductive coating material in photovoltaic cells, smart windows, organic light-emitting diodes and flat-panel displays.

It has recently been discovered that the applications of indium tin oxide can be enhanced by using nanostructures of indium tin oxide. Nanowires of indium tin oxide are of particular utility.

Accordingly, those skilled in the art continue to seek new techniques for manufacturing indium tin oxide nanowires and for enhancing the properties, including the electrical conductivity, of indium tin oxide nanowires.

SUMMARY

In one aspect, the disclosed method for manufacturing indium tin oxide nanowires may include the steps of (1) preparing a solution that includes an indium-containing species, a tin-containing species and a polymeric material, wherein the solution has a molar ratio of tin to indium in a range from about 5 to about 15 percent, (2) electro spinning fibers using the solution, and (3) heating the fibers to a calcination temperature and maintaining the fibers at the calcination temperature for a predetermined calcination time.

Other aspects of the disclosed method for manufacturing indium tin oxide nanowires will become apparent from the following description, the accompanying drawings and the appended claims.

DETAILED DESCRIPTION

It has now been discovered that an electrospinning process may be used to manufacture indium tin oxide nanowires at a relatively high yield. The indium tin oxide nanowires produced in accordance with the present disclosure exhibit a higher electrical conductivity compared to indium tin oxide nanowires produced from other published work.

Figure 1:
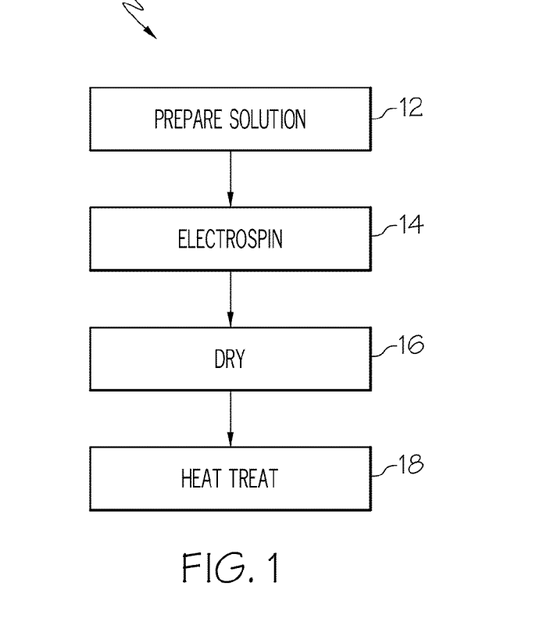
FIG. 1 is flow chart illustrating one aspect of the disclosed method for manufacturing indium tin oxide nanowires.

Referring to FIG. 1, the disclosed method for manufacturing indium tin oxide nanowires, generally designated 10, may include the steps of preparing an electrospinning solution (step 12), electrospinning fibers using the electrospinning solution (step 14), drying the electrospun fibers (step 16) and heat treating the electrospun fibers (step 18). Additional steps may be performed without departing from the scope of the present method 10.

The step 12 of preparing an electrospinning solution may include combining an indium-containing species, a tin-containing species and a polymeric material in a solvent system to form a solution. The electrospinning solution may be in the form of a sol-gel.

The indium-containing species may be an indium salt or a combination of indium salts. Examples of useful indium salts include indium nitrate ($In(NO_3)_3$), indium sulfate and indium halides, such as indium chloride.

The tin-containing species may be a tin salt or a combination of tin salts. Examples of useful tin salts include tin nitrate, tin sulfate and tin halides, such as tin chloride ($SnCl_4$).

The polymeric material may be any polymeric material or combination of polymeric materials capable of forming fibers that support the indium-containing species and the tin-containing species upon electrospinning the electrospinning solution. For example, the polymeric material may include poly(vinylpyrrolidone), poly(vinyl alcohol), poly(aniline), poly(ethylene oxide) and combinations thereof.

The indium-containing species and the tin-containing species may be dissolved in a solvent, such as an aqueous solvent (e.g., de-ionized water), to form a precursor solution. The polymeric material may be dissolved in a solvent, such as an organic solvent (e.g., ethanol, methanol, tetrahydrofuran, acetonitrile, acetone and mixtures thereof), to form a polymer solution. The electrospinning solution may be formed by mixing the precursor solution with the polymer solution. In a specific example, the precursor solution may be vigorously mixed with the polymer solution to form a sol-gel.

In one particular expression, the molar ratio of tin to indium in the electrospinning solution may range from about 5 to about 15 percent and, as a specific example, the molar ratio of tin to indium in the electrospinning solution may be about 10 percent. Without being limited to any particular theory, a molar ratio of tin to indium of about 10 resulted in the formation of indium tin oxide nanowires having the lowest electrical resistivity and the greatest electrical conductivity.

The quantity of the indium-containing species and the tin-containing species in the electrospinning solution relative to the quantity of the polymeric material may dictate the size, specifically the cross-sectional thickness, of the resulting nanowires. Specifically, a relatively small quantity of the indium-containing species and the tin-containing species relative to the quantity of polymeric material in the electrospinning solution may result in relatively thin indium tin oxide nanowires. In one particular expression, the indium-containing species and the tin-containing species may comprise about 2 to about 15 percent by weight of the electrospinning solution and the ratio of the indium-containing species and the tin-containing species to the polymeric material may range from about 0.1 to about 1.

As a general example, the electrospinning solution may comprise about 2 to about 15 percent by weight, more specifically about 5 to about 8 percent by weight, of both the indium-containing species and the tin-containing species at a molar ratio of tin to indium of about 5 to about 15 percent. Additionally, the electrospinning solution may comprise about 5 to about 30 percent by weight of the polymeric material, about 5 to about 20 percent by weight, more specifically about 13 to about 15 percent by weight, water, and the balance organic solvent.

As a first specific example, the electrospinning solution may be prepared as shown in Table 1:

TABLE 1

| Components | Percent of Formulation (by weight) |
| --- | --- |
| Poly(vinylpyrrolidone) | 10.5 |
| Ethanol | 67.7 |
| $In(NO_3)_3 \cdot xH_2O$ | 6.8 |
| $SnCl_4 \cdot 5H_2O$ | 0.7 |
| Water | 14.3 | wherein the $In(NO_3)_3$ and $SnCl_4$ were dissolved in the water to form the precursor solution, the poly(vinylpyrrolidone) was dissolved in the ethanol to form the polymer solution, and the precursor solution was vigorously mixed with the polymer solution to form an opaque sol-gel (i.e., the electrospinning solution).

As a second specific example, the electrospinning solution may be prepared as shown in Table 2:

TABLE 2

| Components | Amount |
| --- | --- |
| Poly(vinylpyrrolidone) | 1.5 grams |
| Ethanol | 10.0 grams |
| $In(NO_3)_3 \cdot xH_2O$ | 0.70 grams |
| $SnCl_4 \cdot 5H_2O$ | 0.065 grams |
| Water | 2.0 milliliters | wherein the $In(NO_3)_3$ and $SnCl_4$ were dissolved in the water to form the precursor solution, the poly(vinylpyrrolidone) was dissolved in the ethanol to form the polymer solution, and the precursor solution was vigorously mixed with the polymer solution to form an opaque sol-gel (i.e., the electrospinning solution).

Figure 5A:
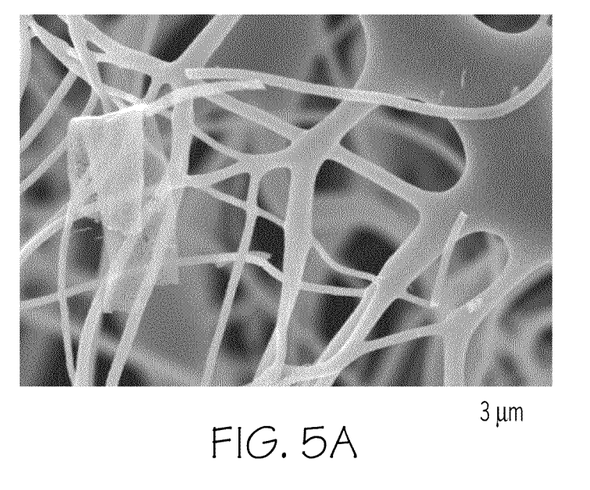
FIGS. 5A and 5B are scanning electron micrograph images of indium tin oxide nanowires manufactured without infrared assistance during the electrospinning step.
Figure 5B:
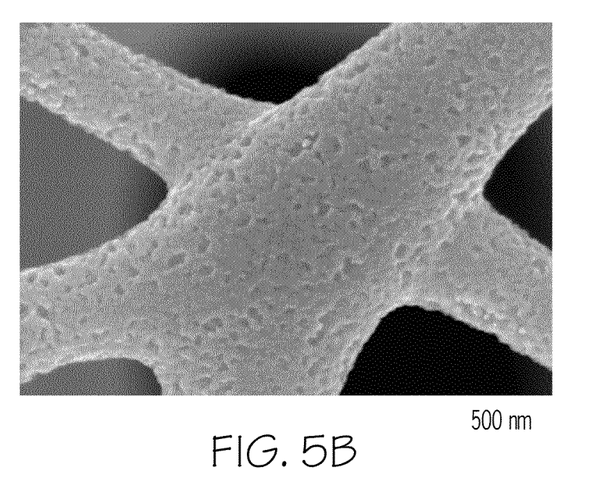
Figure 6A:
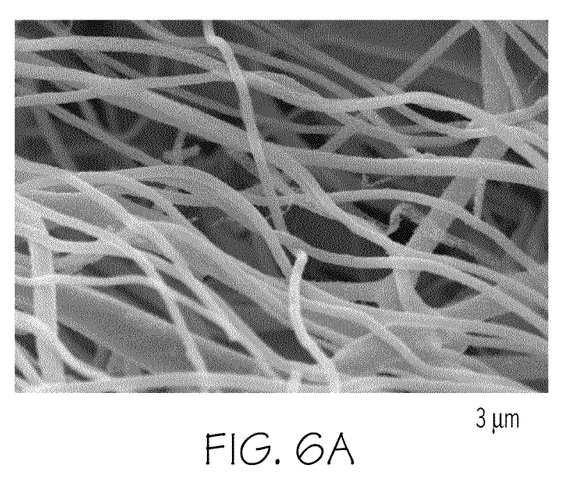
FIGS. 6A and 6B are scanning electron micrograph images of indium tin oxide nanowires manufactured with infrared assistance during the electrospinning step.
Figure 6B:
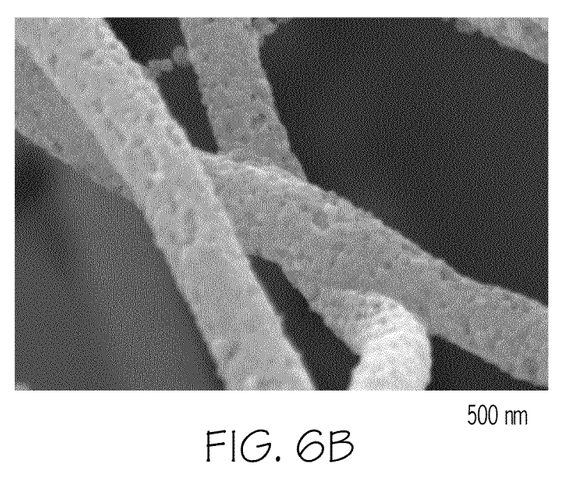

Infrared irradiation may be used during the electrospinning step 14 (FIG. 1). The use of infrared irradiation is believed to help the formation of straighter indium tin oxide nanowires with less cross knots. FIGS. 5A and 5B are the SEM images of indium tin oxide nanowires formed without the infrared irradiation during the electrospinning step 14 and FIGS. 6A and 6B are the SEM images of indium tin oxide nanowires formed with the infrared irradiation during the electrospinning step 14. It should be understood that the infrared irradiation improves the quality of the nanowires but is not absolutely required for the formation of the disclosed indium tin oxide nanowires.

The electrospinning step 14 may involve electrospinning composite fibers that include the indium-tin-containing species and polymeric material. The fibers formed during the electrospinning step 14 may have a cross-sectional thickness ranging, for example, from about 1 to about 100 micrometers.

Figure 2:
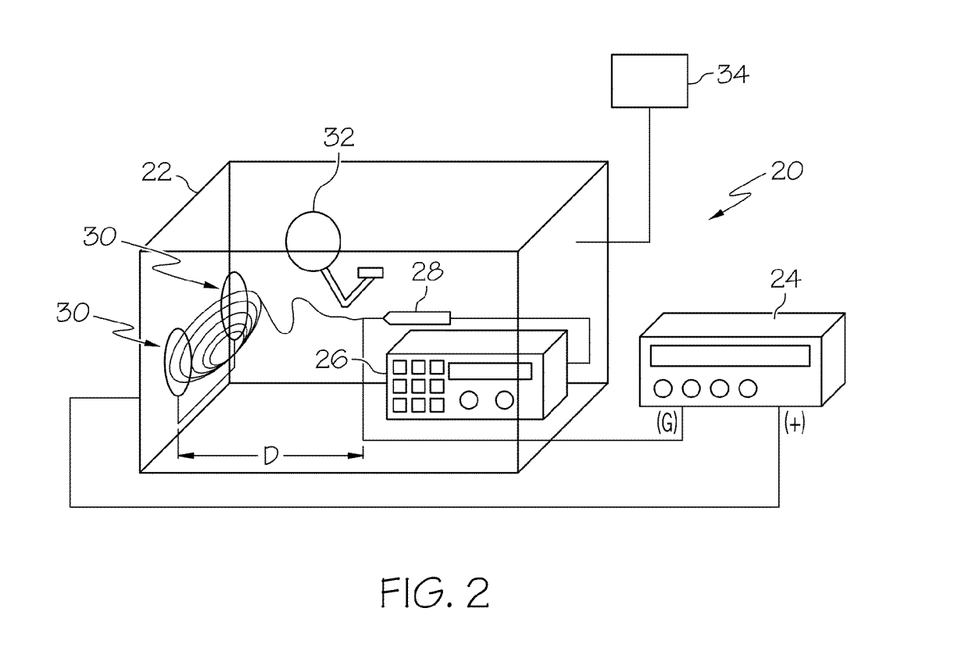
FIG. 2 is a schematic illustration of one implementation of an apparatus for performing the electrospinning step of FIG. 1.

Referring to FIG. 2, one implementation of an apparatus for performing the electrospinning step 14 (FIG. 1) is shown and has been designated 20. The electrospinning apparatus 20 may include a chamber 22, a high voltage power source 24, a syringe pump 26 having a needle 28, one or more collectors 30 and an infrared source 32. The collectors 30 may be spaced from the needle 28 of the syringe pump 26 by a distance D, which, for example, may range from about 2 to about 20 centimeters.

As an example, the chamber 22 may be formed as a transparent box, the power source 24 may be a high-voltage direct-current unit, such as the Serial EL available from Glassman High Voltage, Inc., the syringe pump 26 may be the Geneie Plus available from Kent Scientific, the needle 28 may be a 27 gauge, 1¼ inch metallic needle associated with a 10-ml syringe available from BD Medical-Becton, Dickinson, and Company, the collectors 30 may be aluminum (e.g., aluminum foil) collectors spaced about 10 to 12 centimeters from the needle 28, and the infrared source 32 may be a 250 W infrared lamp (operating at 115 to 125 V). The infrared source 32 may be positioned in the chamber 22 or may be external of the chamber 22 and may direct infrared radiation through the walls of the chamber 22.

A gas flow system 34 may be provided for controlling the humidity within the chamber 22. For example, the gas flow system 34 may bubble an inert gas (e.g., nitrogen) through water and may pass the humidified gas through the chamber 22. For example, the gas flow system 34 may pass the humidified gas through the chamber 22 at a flow rate of about 0 to about 20 milliliters per minute to achieve a desired relative humidity within the chamber 22. In one particular expression, the relative humidity within the chamber 22 may be controlled to within a range of about 15 to about 60 percent.

The positive terminal of the power source 24 may be electrically coupled to the collectors 30 and the negative terminal of the power source 24 may be electrically coupled to the needle 28 of the syringe pump 26. During electrospinning, the voltage applied by the power source 24 may range from about 5 kV to about 15 kV. The skilled artisan will appreciate that the variation of voltage may generate fibers with different morphologies, including diameter and length.

During the electrospinning step 14 (FIG. 1), the chamber 22 may define a sealed, inert atmosphere (e.g., air or nitrogen), the gas flow system 34 may be initiated to control the humidity in the chamber 22, the infrared source 32 may be activated to emit infrared radiation into the chamber 22, the power source 24 may be actuated to apply the desired voltage across the collectors 30 and the needle 28, and the syringe pump 26 may be actuated to supply the electrospinning solution (formed during step 12 in FIG. 1) to the needle 28. The electrospinning solution may be fed to the needle 28 at a rate ranging from about 0.5 to about 1.5 milliliters per hour, such as about 1.2 milliliters per hour.

Thus, the electrospinning step 14 may result in the formation of fibers that include the indium-tin-containing species. The gas flow system 34 may control the moisture content of the fibers during formation and the infrared source 32 may facilitate at least partial drying of the fibers during formation.

Referring back to FIG. 1, the electrospun fibers may, optionally, be dried at step 16. The drying step 16 may be used to remove solvents from the electrospun fibers and may prevent or inhibit coalescence or cross-linking of the fibers. For example, the fibers collected during the electrospinning step 14 may be placed in an oven maintained at a drying temperature of, for example, about 100 to about 200° C. and dried for a drying time, such as about 2 hours to 2 days or more. The drying step 16 may be performed in air.

Once the electrospun fibers are dry or nearly dry (e.g., moisture content less than 20 percent by weight), the method 10 may proceed to the heat treatment step 18, wherein the fibers are exposed to a calcination temperature for a calcination time. The heat treatment step 18 may occur in an atmosphere of air, hydrogen or a mixture of air and hydrogen. The heat treatment (calcination) step 18 may remove the polymeric material from the fibers and may produce indium tin oxide from the indium-tin-containing species.

In one particular implementation, the calcination temperature may range from about 400° C. to about 1200° C., more particularly about 700° C. to about 1000° C., and the calcination time may range from about 2 hours to about 1 week or more. The fibers may be raised to the calcination temperature at a ramp rate ranging from about 2 to about 20° C. per minute, such as about 5° C. per minute.

Figure 4A:
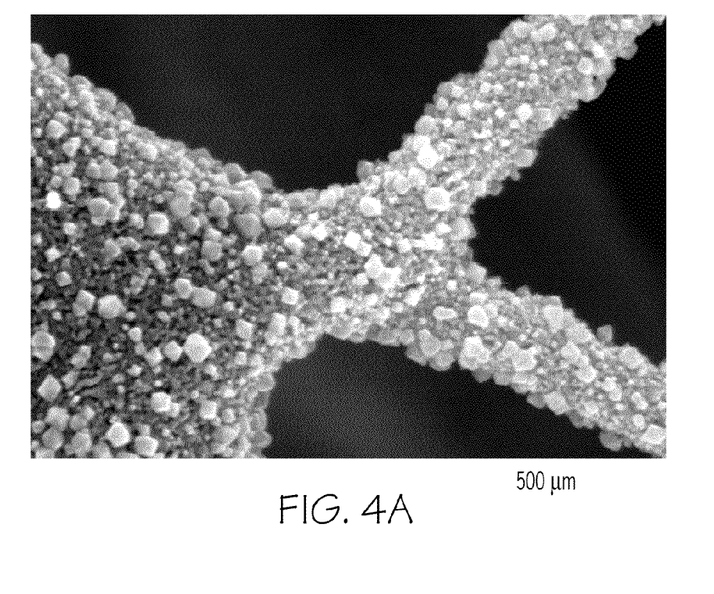
FIG. 4A is a scanning electron micrograph of indium tin oxide nanowires prepared using the method of FIG. 1, wherein the heat treatment step included calcination in air at 700° C. for 5 hours followed by calcination at 579° C. for 120 hours.
Figure 4B:
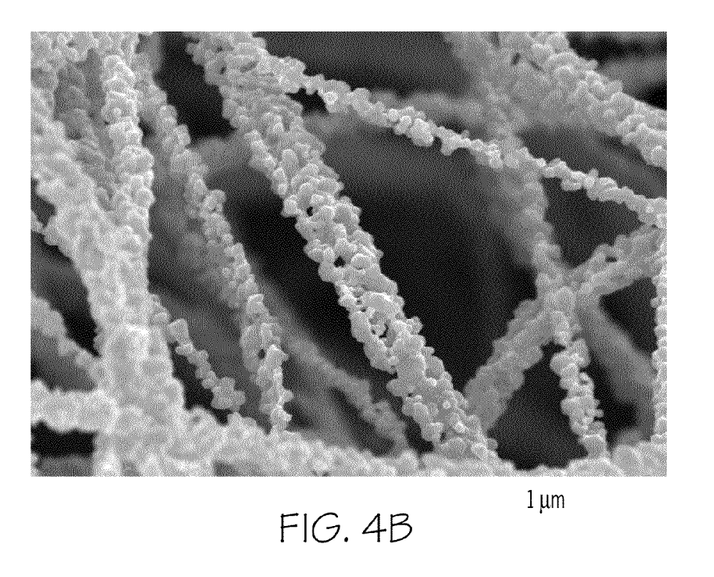
FIG. 4B is a scanning electron micrograph of indium tin oxide nanowires prepared using the method of FIG. 1, wherein the heat treatment step included calcination in air at 1000° C. for 24 hours.

Various calcination temperatures were explored and successfully resulted in the formation an indium tin oxide nanowires, including indium tin oxide nanowires having desirable properties, such as relatively high electrical conductivity. Relatively low calcination temperatures, such as calcination temperatures at and below 700° C., may result in the formation of indium tin oxide nanowires having crystalline particles on the surface thereof, as shown in FIG. 4A. Relatively high calcination temperatures, such as calcination temperatures at and above 1000° C., may result in the formation of porous indium tin oxide nanowires, as shown in FIG. 4B.

EXAMPLES

Example 1

Figure 3A:
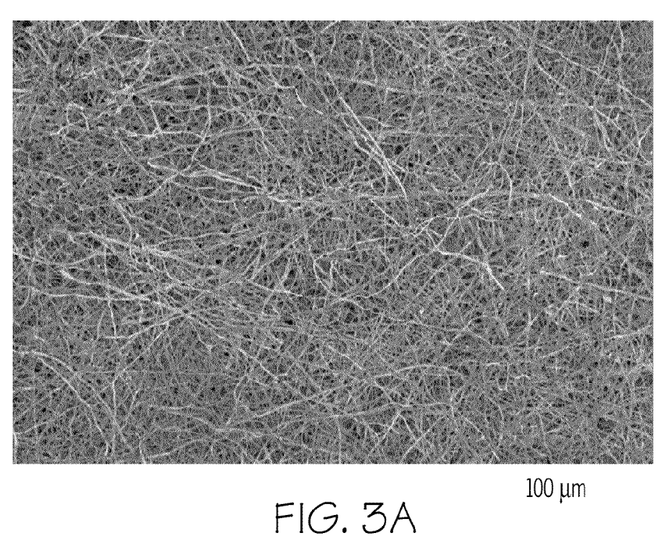
FIG. 3A is a scanning electron micrograph of indium tin oxide nanowires prepared using the method of FIG. 1, shown at a first level of magnification.
Figure 3B:
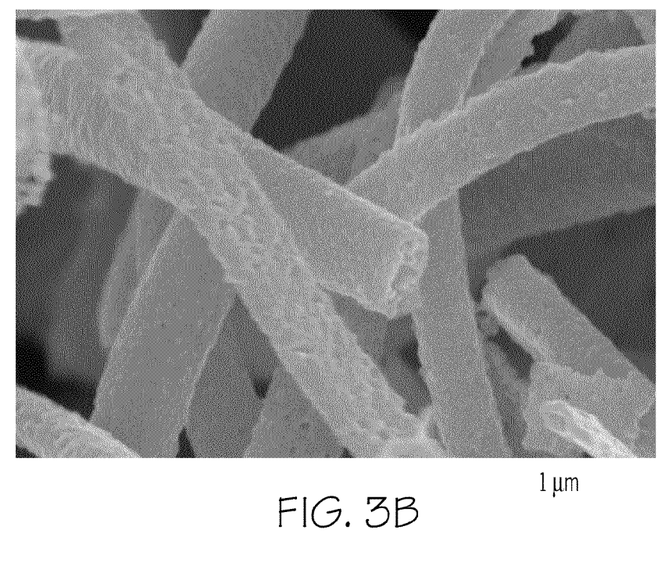
FIG. 3B is a scanning electron micrograph of the indium tin oxide nanowires of FIG. 3A, shown at a second, greater level of magnification.

Electrospun fibers were prepared using the electrospinning solution formulation of Table 2 and the apparatus of FIG. 2. The applied voltage was 15 kV, the relative humidity was controlled to about 50 percent, and the electrospinning solution flowed at a rate of 1.2 milliliters per hour. The resulting fibers were dried in an oven in air at 120° C. for 2 hours. After 2 hours of drying, the oven temperature was increased to 800° C. at a heat rate of 5° C. per minute. The dried fibers were then maintained at 800° C. for 24 hours, resulting in the formation of the indium tin oxide nanowires shown in FIGS. 3A and 3B. The cross-sectional thickness of the resulting nanowires ranged from about 100 to about 500 nanometers. Approximately 100 to 150 milligrams of indium tin oxide were produced per day using this set-up.

Example 2

Electrospun fibers were prepared as described in Example 1. The resulting fibers were dried in an oven in air at 120° C. for 2 hours. After 2 hours of drying, the oven temperature was increased to 1000° C. at a heat rate of 5° C. per minute. The dried fibers were then maintained at 1000° C. for 7 hours, after which the temperature was reduced to 800° C. and the fibers were maintained at 800° C. for 24 hours.

Example 3

The elemental analyses of the indium tin oxide nanowires produced in Example 1 and Example 2 are provided in Table 3. The content of carbon was undetectable, suggesting that all of the polymeric material was removed during the heat treating step 18 (FIG. 1). The indium to tin ratios were about 10, which is close to the ratio used in the formulation, suggesting that the material is about 10 percent tin-doped indium oxide and should have good electrical conductivity. The oxygen to indium ratio was slightly lower than the fully oxidized forms, suggesting slight oxygen deficiency which is good for electrical conductivity.

TABLE 3

| Process | Percent (by moles) | | | | Mole Ratio in Sample (Mole Ratio in Formulation) | |
|---|---|---|---|---|---|---|
| | C | O | In | Sn | In:Sn | O:In |
| 800° C. for 24 h | <0.001 | 1.02 | 0.63 | 0.069 | 10.2 (9.49) | 1.61 (1.71) |
| 1000° C. for 7 h then 800° C. for 24 h | <0.001 | 1.04 | 0.64 | 0.067 | 10.6 (9.49) | 1.63 (1.71) |

Example 4

A multi-step process involving photoresist spin-coating and patterning using mask and UV illumination was used to deposit titanium/gold electrodes at both ends of the ITO nanowires produced in Example 1 and Example 2. Using the deposited electrodes, the electrical resistance was measured and averaged about $3.4 \times 10^{-3}$ $\Omega$-cm. After repeating the analysis several times on various nanowires produced in accordance with the present disclosure, resistivities in the $10^{-3}$ $\Omega$-cm range were repeatedly obtained, thereby suggesting that the indium tin oxide nanowires are uniform and the disclosed method is consistent.

Although various aspects of the disclosed method for manufacturing indium tin oxide nanowires have been shown and described, modifications may occur to those skilled in the art upon reading the specification. The present application includes such modifications and is limited only by the scope of the claims.

What is claimed is:

1. A method for manufacturing indium tin oxide nanowires with a resistivity of about $10^{-3}$ $\Omega$-cm, the method comprising:
    preparing a precursor aqueous solution comprising a tin-containing specie and an indium-containing specie wherein the molar ratio of the tin-containing specie to the indium-containing specie is about 5 to about 15%;
    preparing a polymer solution comprising an organic solvent;
    mixing the precursor solution with the polymer solution to produce an electrospinning solution or sol-gel wherein together the tin-containing specie and the indium-containing specie are from about 2% to about 15% by weight of the electrospinning solution or sol-gel;
    electrospinning the electrospinning solution or sol-gel at a relative humidity from about 15 to about 60 percent while irradiating the electrospinning solution or sol-gel with infrared radiation to provide the indium-tin nanowires with a cross-sectional thickness of from about 1 to about 100 micrometers;

drying the indium tin oxide nanowires at a drying temperature of about 100° C. to about 200° C. to a moisture content of less than about 20% by weight;

heating the indium tin oxide nanowires, at a rate between about 2 and about 20° C. per minute from the drying temperature to a calcination temperature of from about 700° C. to about 1000° C.; and maintaining the calcination temperature for a time from two hours to one week to provide indium tin oxide nanowires with a resistivity of about $10^{-3}$ Ω-cm.

2. The method according to claim 1, wherein the molar ratio of the tin-containing specie to the indium-containing specie is about 10%.

3. The method according to claim 1, wherein the organic solvent comprises at least one of ethanol, methanol, tetrahydrofuran, acetonitrile, and acetone.

4. The method according to claim 1, wherein together the tin-containing specie and the indium-containing specie are about 5% to about 8% by weight of the electrospinning solution or sol-gel.

5. The method according to claim 1, wherein the drying step is performed in air.

6. The method according to claim 1, wherein the heating step is performed in air, hydrogen, or a mixture of air and hydrogen.

7. The method according to claim 6 wherein the heating step is performed in a mixture of air and hydrogen.

8. The method according to claim 6 wherein the heating step is performed in hydrogen.

9. The method according to claim 1, wherein the calcination temperature is maintained for about 2 hours.

10. The method according to claim 1, wherein the calcination temperature is maintained for about one week.

* * * * *